(12) United States Patent
Voor et al.

(10) Patent No.: US 10,261,929 B2
(45) Date of Patent: Apr. 16, 2019

(54) ENHANCED GROUND BOUNCE IMMUNITY ON USB TYPE-C POWER DELIVERY COMMUNICATION

(71) Applicant: Dell Products L.P., Round Rock, TX (US)

(72) Inventors: Thomas E. Voor, Cedar Park, TX (US); Merle J. Wood, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 29 days.

(21) Appl. No.: 15/046,610

(22) Filed: Feb. 18, 2016

(65) Prior Publication Data

US 2017/0242814 A1 Aug. 24, 2017

(51) Int. Cl.
*G06F 1/26* (2006.01)
*G06F 13/38* (2006.01)

(52) U.S. Cl.
CPC ............ *G06F 13/385* (2013.01); *G06F 1/266* (2013.01)

(58) Field of Classification Search
CPC ..... G06F 13/385; G06F 1/3287; G06F 9/4411
See application file for complete search history.

(56) References Cited

U.S. PATENT DOCUMENTS

2001/0032324 A1* 10/2001 Slaughter .............. G06F 11/142 714/4.2
2012/0297207 A1* 11/2012 Carlsen ............... G06F 13/4081 713/300
2015/0362984 A1* 12/2015 Waters .................. G06F 1/3287 713/324
2017/0052578 A1* 2/2017 Agarwal ................. G06F 1/263
2017/0115711 A1* 4/2017 Jaramillo ............... G06F 13/102

OTHER PUBLICATIONS

Altera White Paper—Minimizing Ground Bounce & Vcc Sag—2001.*
Burke Henehan, Maximizing EOS and ESD Immunity in High-Performance Serial Buses, Feb. 1, 2007 http://www.edn.com/design/analog/4314519/Maximizing-EOS-and-ESD-immunity-in-high-performance-serial-buses.
Wikipedia.com, USB-C, https://en.wikipedia.org/wiki/USB-C, printed Aug. 17, 2017.

* cited by examiner

*Primary Examiner* — Idriss N Alrobaye
*Assistant Examiner* — Ronald T Modo
(74) *Attorney, Agent, or Firm* — Terrile, Cannatti & Chambers; Stephen A. Terrile

(57) ABSTRACT

A system and method for enhancing ground bounce immunity of cables such as USB type-C cables. More specifically, in certain embodiments, ground bounce immunity is enhanced by making use of alternate modes of operation of cables conforming to the USB 3.1 specification to achieve a higher power over a cable that conforms to the USB 3.1 voltage drop specification requirements on the ground signal paths when the cable is operating at normal power levels (i.e., at a power level supported by the USB 3.1 specification). In certain embodiments, ground bounce immunity is enhanced by making use of alternate modes of operation of USB 3.1 type cables and standard use USB3.1 power delivery negotiation protocol to allow a host and end device to negotiate higher power than what would normally conform to the USB 3.1 specification.

18 Claims, 3 Drawing Sheets

ENHANCED GROUND BOUNCE IMMUNITY ON USB TYPE-C POWER DELIVERY COMMUNICATION

BACKGROUND OF THE INVENTION

Field of the Invention

The present invention relates to information handling systems. More specifically, embodiments of the invention relate to enhancing ground bounce immunity of cables such as USB type-C cables.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to communicate among components of information handling systems via a serial bus. For example, serial buses which conform to various universal serial bus (USB) specifications are known. An example of the USB specification is the USB 3.1 specification (often referred to as USB Type-C). One issue relating to cables implementing a serial bus which correspond to the USB 3.1 specification is ground bounce immunity.

The USB 3.1 specification defines a limit on ground (GND) bounce as well as voltage drop on the various signal paths including the ground signal paths due to cable resistance which often requires a high power cable and or the use of large diameter wires for the ground lines. However, it is often desirable from a user experience perspective to provide cables which are relatively long as well as relatively flexible. For example, it would be desirable to provide flexible cables with lengths such as 1 -2 meters (+/−15%).

SUMMARY OF THE INVENTION

A system and method are disclosed for enhancing ground bounce immunity of cables such as USB type-C cables. More specifically, in certain embodiments, ground bounce immunity is enhanced by making use of alternate modes of operation of cables conforming to the USB 3.1 specification to achieve a higher power over a cable that conforms to the USB 3.1 voltage drop specification requirements on the ground signal paths when the cable is operating at normal power levels (i.e., at a power level supported by the USB 3.1 specification). For example, according to the USB 3.1 specification, a cable with 3 Amps of current can have 0.25V of I*R drop on the GND return signal paths. An electronic marker (E-marker) in this cable identifies the cable as having a 3 Amp current limit. However, the E-marker can identify availability of an alternate mode of operation if a host and a device coupled to the other end of the cable each support changing a control signal path (e.g., a configuration channel (CC) signal path) reference voltage. When this alternate mode is entered into, CC signal path communication is briefly suspended, the USB port controllers in the Host, cable, and device all change their reference voltage and increase the voltage swing on CC signal path, then resume communication in this new mode of operation. A higher current (e.g., 4.2 Amps of current) is allowed on the GND return signal paths. Because the cable resistance stays constant, the I*R voltage drop on the ground signal paths is now 0.35V. Because the voltage swing and reference voltage on control signal path (e.g., the CC signal path) has increased, the control signal path can also accommodate 0.35V of GND bounce with no disruption in control communication.

In certain embodiments, ground bounce immunity is enhanced by making use of alternate modes of operation of USB3.1 type cables and standard use USB3.1 power delivery negotiation protocol to allow a host and end device to negotiate higher power than what would normally conform to the USB 3.1 Specification. For example, in certain embodiments the host might comprise a work station type laptop requiring 130 Watts power. For example, the USB 3.1 specification might have a maximum supported power limit of 100 Watts. This negotiation is only performed with systems that can safely operate in a higher power mode of operation (e.g., a 130 Watts mode of operation) and I/O systems (e.g., docking stations) that can safely deliver this power. In certain embodiments, the negotiation of the higher power mode of operation is only performed when a particular manufacturer host system, docking cable of the particular manufacturer and I/O device of the particular manufacturer are connected. In certain embodiments, the negotiation of the higher power mode of operation prevents other manufacturer's devices from accessing the higher power when connected to the particular manufacturer's power delivery devices.

The negotiation of the higher power mode of operation enables the diameter of the cable to be minimized when compared to the diameter that would be required without use of the negotiation operation. For example, with certain cables, the diameter of the wires included within the cable would need to be increased to accommodate 4.2 Amps of current with 0.25V of VR voltage drop on the ground signal paths. Such an increased diameter would make the cable less flexible, and the diameter of the bundle larger. Additionally, this negotiation of the higher power mode of operation enables a cable bundle that can fit properly with an over mold housing of a USB Type-C plug.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
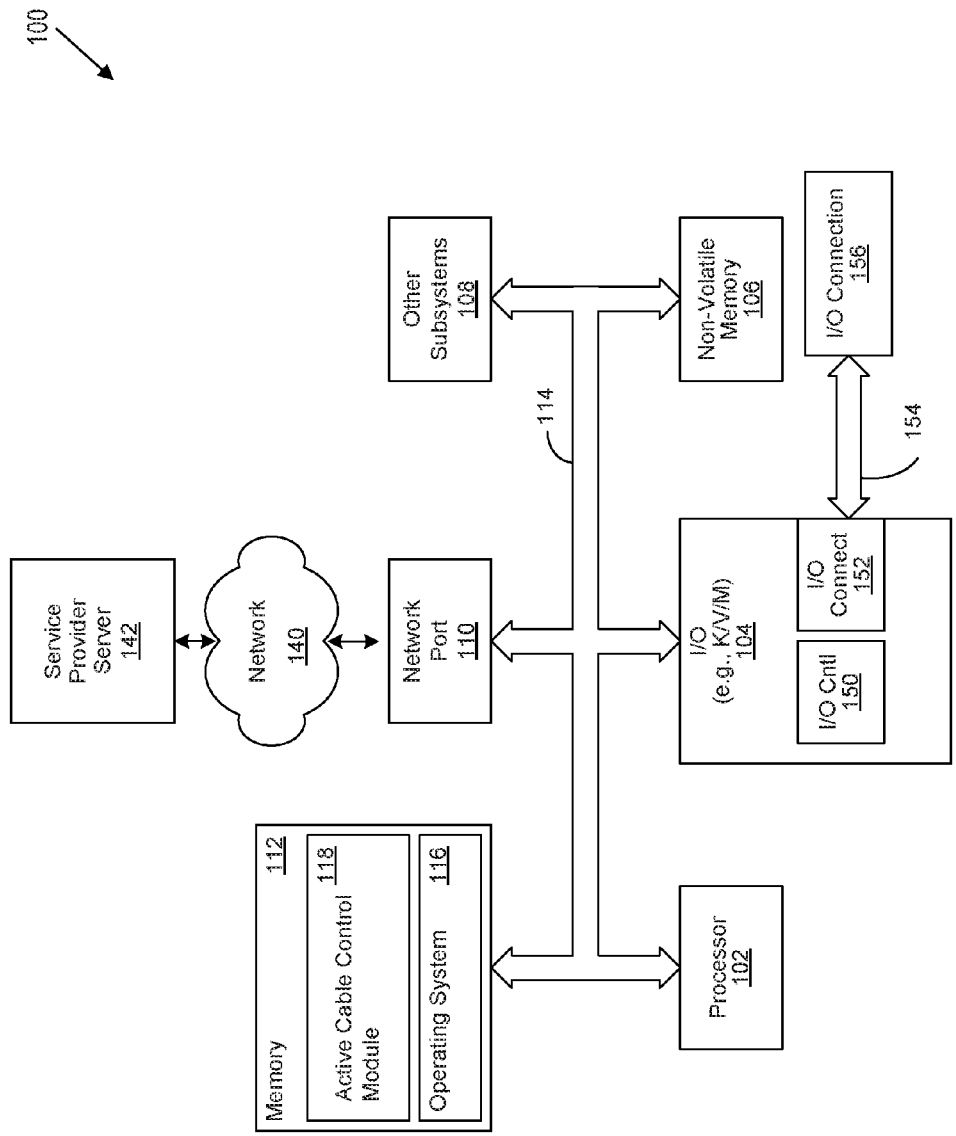
FIG. 1 shows a general illustration of components of an information handling system as implemented in the system and method of the present invention.

Aspects of this disclosure include a recognition that the communication of the configuration channel (CC) signal path of USB Type-C interface is normally 1.1V peak to peak, and is not normally tolerant to higher than 0.25V of GND bounce. Cables that support 60 Watts (via e.g., 20V and 3 Amps) with 0.25V of I*R voltage drop on GND wires can be configured with acceptable cable bundle diameter and flexibility. For example, when a cable bundle is 4.8 mm in diameter, a strain relief collar can be provided which maintain a 6.5 mm outside Z dimension. When a USB Type-C plug with a 6.5 mm Z dimension is attached to a tablet, the tablet and cable can lay on a flat table without interference. However, when the Z dimension of the USB Type-C plug is larger than 6.5 mm, the connector will cause the tablet to lift off of the resting surface and the weight of the tablet bears down on the Type-C plug. This force can cause reliability and user satisfaction issues. However, workstations which have higher power requirements (e.g., 90 Watts or 130 Watts) would require a larger diameter cable bundle (e.g., a cable bundle having 7.6 mm diameter). Such a larger diameter cable bundle is likely not acceptable from a usability perspective and might not even fit into an over mold of standard USB Type-C plug which 6.5 mm thick.

Aspects of this disclosure include a recognition that it would be desirable to provide a cable bundle carry 130 Watts of power, is acceptable for usability, and can fit into the Type-C plug over mold housing. In certain embodiments, the cable bundle has a diameter of substantially 5.6 mm (i.e., =/−10%).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise active cable control module 118.

Additionally, in various embodiments, I/O devices 104 of the information handling system 100 comprise an integrated I/O controller 150 as well as an integrated I/O connector 152. In certain embodiments, the integrated I/O controller 150 comprises a Thunderbolt 3 type integrated I/O controller. In certain embodiments, the integrated I/O connector comprises a USB Type-C connector. A multi-modal cable 154 may be coupled to the connector 152. Additionally, in certain embodiments the multi-modal cable 154 may be coupled with an I/O connection device 156 such as a docking station.

In certain embodiments, the multi-modal cable 154 provides enhanced ground bounce immunity. For the purposes of this disclosure ground bounce immunity may be defined as a power level above which communication on the cable is immune to ground bounce (i.e., where a transmission voltage appears as less than a local ground potential). More specifically, in certain embodiments, ground bounce immunity is enhanced by making use of alternate modes of operation of cables conforming to the USB 3.1 specification to achieve a higher power over a cable that conforms to the USB 3.1 voltage drop specification requirements on the ground signal paths when the cable is operating at normal power levels (i.e., at a power level supported by the USB 3.1 specification). For example, according to the USB 3.1 specification, a cable with 3 Amps of current can have 0.25V of I*R drop on the GND return signal paths. An E-marker in this cable identifies the cable as having a 3 Amp current limit. However, the E-marker can identify, availability of an alternate mode of operation if a host and a device coupled to the other end of the cable each support changing a control signal path (e.g., a configuration channel (CC) signal path) reference voltage. When this alternate mode is entered into, CC signal path communication is briefly suspended, the USB port controllers in the host, cable, and device all change their reference voltage and increase the voltage swing on CC signal path, then resume communication in this new mode of operation. A higher current (e.g., 4.2 Amps of current) is allowed on the GSI) return signal paths. Because the cable resistance stays constant, the PR voltage drop on the ground signal paths is now 0.35V. Because the voltage swing and reference voltage on control signal path (e.g., the CC signal path) has increased, the control signal path can also accommodate 0.35V of GIN bounce with no disruption in control communication.

In certain embodiments, ground bounce immunity is enhanced by making use of alternate modes of operation of USB3.1 type cables and standard use USB3.1 power delivery negotiation protocol to allow a host and end device to negotiate higher power than what would normally conform to the USB 3.1 Specification. For example, in certain embodiments the host might comprise a work station type laptop requiring 130 Watts power. For example, the USB 3.1 specification might have a maximum supported power limit of 100 Watts. This negotiation is only performed with systems that can safely operate in a higher power mode of operation (e.g., a 130 Watts mode of operation) and I/O systems (e.g., docking stations) that can safely deliver this power. In certain embodiments, the negotiation of the higher power mode of operation is only performed when a particular manufacturer host system, docking cable of the particular manufacturer and I/O device of the particular manufacturer are connected. In certain embodiments, the negotiation of the higher power mode of operation prevents other manufacturer's devices from accessing the higher power when connected to the particular manufacturer's power delivery devices.

The negotiation of the higher power mode of operation enables the diameter of the cable to be minimized when compared to the diameter that would be required without use of the negotiation operation. For example, with certain cables, the diameter of the wires included within the cable would need to be increased to accommodate 4.2 Amps of current with 0.25V of I*R voltage drop on the ground signal paths. Such an increased diameter would make the cable less flexible, and the diameter of the bundle larger. Additionally, this negotiation of the higher power mode of operation enables a cable bundle that can fit properly with an over mold housing of a USB Type-C plug.

Figure 2:
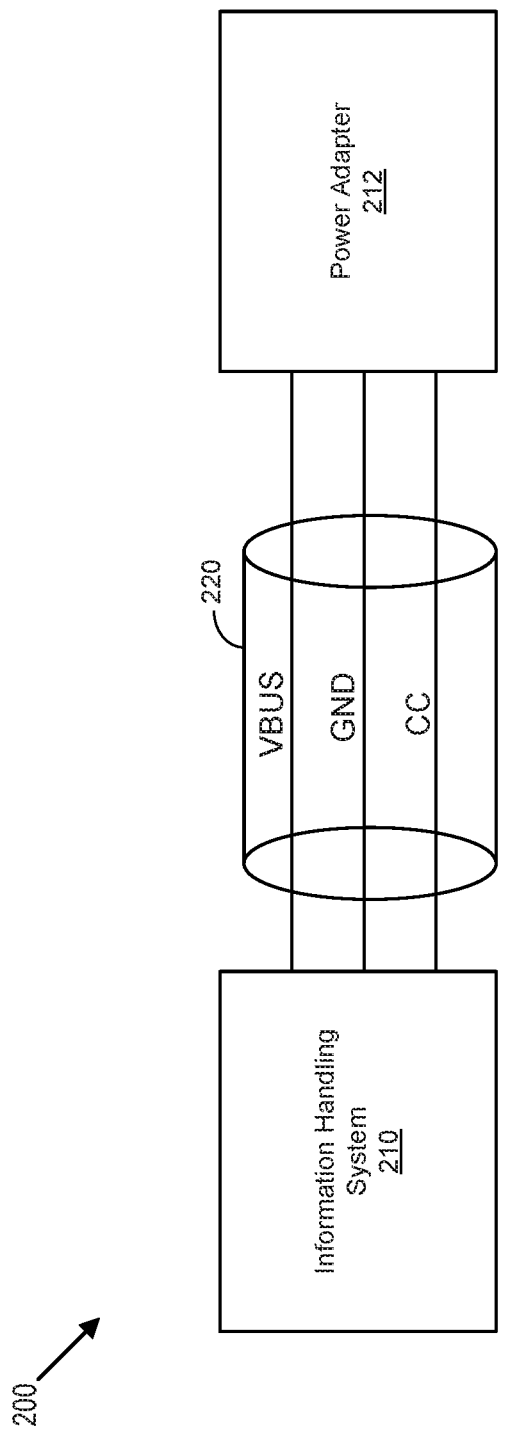
FIG. 2 shows a block diagram of an environment for enhancing ground bounce immunity of cables.

FIG. 2 is a block diagram of an environment 200 for enhancing ground bounce immunity of cables. More specifically, the environment 200 includes an information handling system 210 (which may include some or all of the elements of information handling system 100) and a power adapter 212. The environment 200 also includes a ground bounce enhanced cable 220 (which may include some or all of the elements of multi-modal cable 154). In certain embodiments the ground bounce enhanced cable 220 conforms to some or all of the portions of a USB Type-C cable. The ground bounce enhanced cable 220 includes a power signal path (VBUS), a ground signal path (GND) and a configuration channel signal path (CC).

Figure 3:
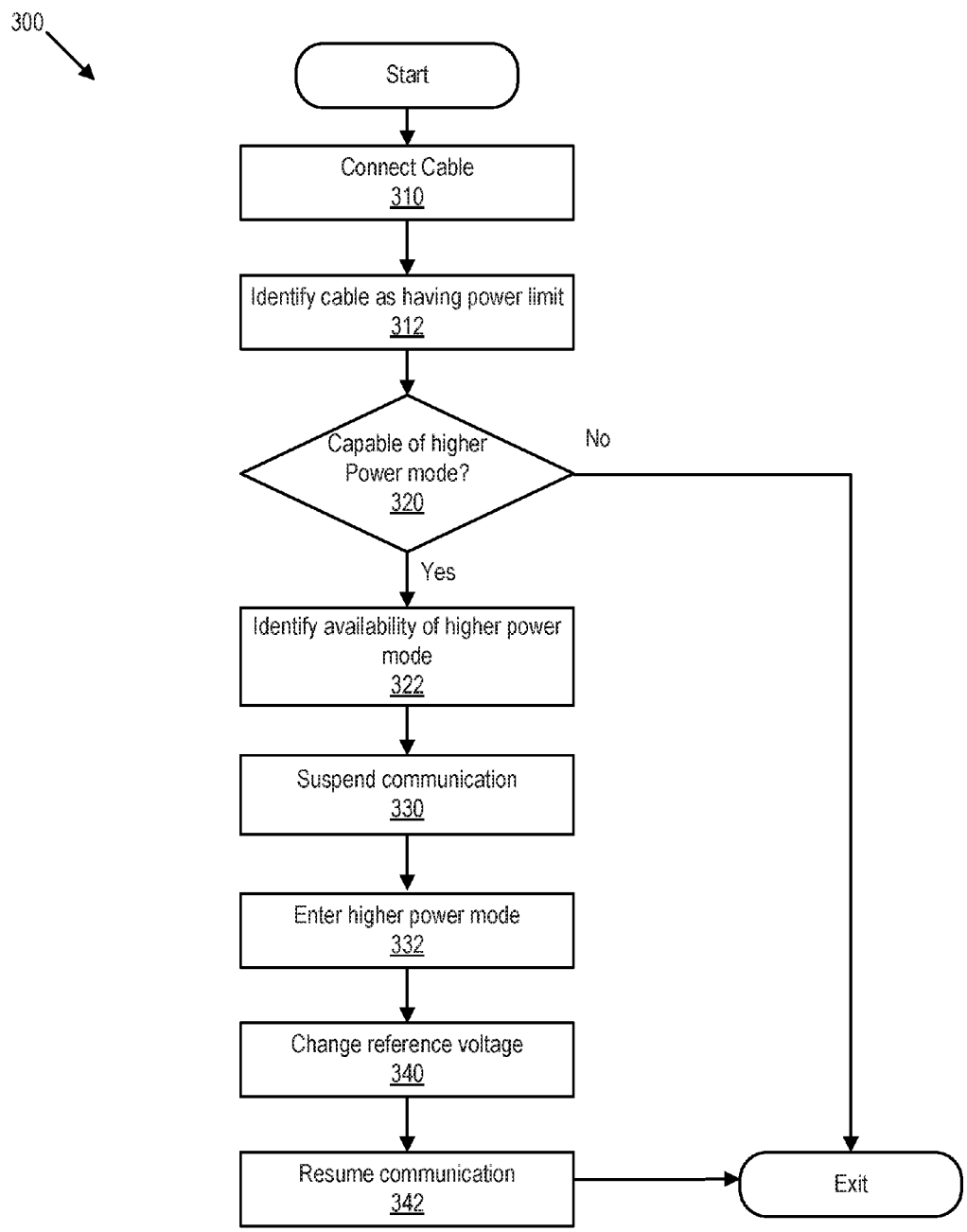
FIG. 3 shows a flow chart of a ground bounce immunity enhance operation.

Referring to FIG. 3, a flow chart of a ground bounce immunity enhance operation 300 is shown. More specifically, in certain embodiments, ground bounce immunity is enhanced by making use of alternate modes of operation of cables conforming to the USB 3.1 specification to achieve a higher power over a cable that conforms to the USB 3.1 voltage drop specification requirements on the ground signal paths when the cable is operating at normal power levels (i.e., at a power level supported by the USB 3.1 specification). For example, according to the USB 3.1 specification, a cable with 3 Amps of current can have 0.25V of I*R drop on the GND return signal paths.

The operation 300 begins at step 310 when the cable is first connected between an information handling system and an adapter. Next at step 312, an E-marker in the cable identifies the cable as having a 3 Amp current limit. Next, at step 320, the operation 300 determines whether the adapter 212 and the information handling system 210 are both capable of generating and receiving a higher current (i.e., of operating in an alternate higher power mode of operation). In certain embodiments, the alternate higher power mode of operation involves changing a control signal path (e.g., a configuration channel (CC) signal path) reference voltage. If either the information handing system 210 or the power adapter 212 are not capable of operating in an alternate higher power mode of operation then the operation 300 completes.

Next, at step 322, the E-marker identifies the availability of the alternate higher power mode of operation. Next, at step 330, communication on the CC signal path is briefly suspended and at step 332 the power adapter 212 and the information handling system 210 enter into the alternate higher power mode of operation. When this alternate higher power mode of operation is entered, then at step 340 USB port controllers (not shown) in the information handling system 210, the cable 220 and the power adapter 212 all change their reference voltage and increase the voltage swing on the CC signal path. Next at step 342, the information handling system 210 and the power adapter 212 resume communication using the new mode of operation.

With the alternate higher power mode of operation, a higher current (e.g., 4.2 Amps of current) is allowed on the GND return signal paths. Because the cable resistance stays constant, the I*R voltage drop on the ground signal paths is now 0.35V. Because the voltage swing and reference voltage on control signal path (e.g., the CC signal path) has increased, the control signal path can also accommodate 0.35V of GND bounce with no disruption in control communication.

In certain embodiments, ground bounce immunity is enhanced by making use of alternate modes of operation of USB3.1 type cables and standard use USB3.1 power delivery negotiation protocol to allow a host (e.g., an information handling system) and an end device (e.g., a power adapter or other type of I/O device such as a docking station) to negotiate higher power than what would normally conform to the USB 3.1 Specification. For example, in certain embodiments the host might comprise a work station type laptop requiring 130 Watts power. For example, the USB 3.1 specification might have a maximum supported power limit of 100 Watts. This negotiation is only performed with systems that can safely operate in a higher power mode of operation a 130 Watts mode of operation) and I/O systems (e.g., docking stations) that can safely deliver this power. In certain embodiments, the negotiation of the higher power mode of operation is only performed when a particular manufacturer host system, docking cable of the particular manufacturer and I/O device of the particular manufacturer are connected. In certain embodiments, the negotiation of the higher power mode of operation prevents other manufacturer's devices from accessing the higher power when connected to the particular manufacturer's power delivery devices.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for enhancing ground bounce immunity of a cable, comprising:
    determining whether a host and a device coupled to the cable are both capable of operating in a higher power mode of operation;
    identifying availability of an alternate higher power mode of operation when the cable, the host and the device are all capable of operating in a higher power mode of operation, the cable indicating an availability of the higher power mode of operation via an electronic marker (E-marker), the E-marker indicating the availability of the higher power mode of operation when the host coupled to a first end of the cable and the device coupled to another end of the cable each support changing a configuration channel signal path reference voltage;
    suspending communication between the host and the device prior to configuring the cable, the host and the device to operate in the higher power mode of operation;
    configuring the cable, the host and the device to operate in the higher power mode of operation via a negotiation between the host and the device, the configuring comprising changing a reference voltage of the cable to operate in the higher power mode of operation; and,
    communicating between the host and the device via the higher power mode of operation, the higher power mode of operation comprising changing the reference voltage to provide enhanced ground bounce immunity for the cable, the enhanced ground bounce immunity providing communication on the cable which is immune to ground bounce when compared to normal power levels of the cable, the normal power levels being defined by a specification for the cable, the ground bounce being defined as a transmission voltage which appears as less than a local ground potential; and
    wherein the suspending communication includes suspending the configuration channel signal path while the host, the cable and the device all change their reference voltage and increase the voltage swing on the configuration channel signal path.

2. The method of claim 1, wherein:
the changing the reference voltage of the cable to operate in the higher power mode of operation comprises increasing the reference voltage on the configuration channel signal path whole maintaining a constant cable resistance.

3. The method of claim 1, wherein:
the cable corresponds to a USB type-C cable.

4. The method of claim 3, wherein:
the reference voltage is changed on the configuration channel signal path.

5. The method of claim 1, wherein:
a diameter of the cable is minimized when compared to a diameter that would be required without use of the negotiation operation.

6. The method of claim 1, wherein:
a cable bundle is configured to fit properly with an over mold housing of a USB Type-C plug while also enabling the higher power mode of operation.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:

determining whether a host and a device coupled to the cable are both capable of operating in a higher power mode of operation;

identifying availability of an alternate higher power mode of operation when the cable, the host and the device are all capable of operating in a higher power mode of operation, the cable providing an availability of the higher power mode of operation via an electronic marker (E-marker), the E-marker indicating the availability of the higher power mode of operation when the host coupled to a first end of the cable and the device coupled to another end of the cable each support changing a configuration channel signal path reference voltage;

suspending communication between the host and the device prior to configuring the cable, the host and the device to operate in the higher power mode of operation;

configuring the cable, the host and the device to operate in the higher power mode of operation via a negotiation between the host and the device, the configuring comprising changing a reference voltage of the cable to operate in the higher power mode of operation; and, communicating between the host and the device via the higher power mode of operation, the higher power mode of operation comprising changing the reference voltage to provide enhanced ground bounce immunity for the cable, the enhanced ground bounce immunity providing communication on the cable which is immune to ground bounce when compared to normal power levels of the cable, the normal power levels being defined by a specification for the cable, the ground bounce being defined as a transmission voltage which appears as less than a local ground potential; and wherein the suspending communication includes suspending the configuration channel signal path while the host, the cable and the device all change their reference voltage and increase the voltage swing on the configuration channel signal path.

8. The system of claim 7, wherein:
the changing the reference voltage of the cable to operate in the higher power mode of operation comprises increasing the reference voltage on the configuration channel signal path whole maintaining a constant cable resistance.

9. The system of claim 7, wherein:
the cable corresponds to a USB type-C cable.

10. The system of claim 9, wherein:
the reference voltage is changed on the configuration channel signal path.

11. The system of claim 7, wherein:
a diameter of the cable is minimized when compared to a diameter that would be required without use of the negotiation operation.

12. The system of claim 7, wherein:
a cable bundle is configured to fit properly with an over mold housing of a USB Type-C plug while also enabling the higher power mode of operation.

13. An environment for enhancing ground bounce immunity comprising:
a cable, the cable being capable of operating in a normal power mode of operation and a higher power mode of operation, the cable indicating an availability of the higher power mode of operation via an electronic marker (E-marker), the E-marker indicating the availability of the higher power mode of operation when the host coupled to a first end of the cable and the device coupled to another end of the cable each support changing a configuration channel signal path reference voltage;

a host coupled to an end of the cable, the host being capable of operating in a higher power mode of operation;

a device coupled to another end of the cable, the device being capable of operating in a higher power mode of operation, the host and the device being configured to:

identify availability of an alternate higher power mode of operation when the host and the device are both capable of operating in a higher power mode of operation;

suspending communication between the host and the device prior to configuring the cable, the host and the device to operate in the higher power mode of operation;

configuring the cable, the host and the device to operate in the higher power mode of operation via a negotiation between the host and the device, the configuring comprising changing a reference voltage of the cable to operate in the higher power mode of operation; and, communicating between the host and the device via the higher power mode of operation, the higher power mode of operation comprising changing the reference voltage to provide enhanced ground bounce immunity for the cable, the enhanced ground bounce immunity providing communication on the cable which is immune to ground bounce when compared to normal power levels of the cable, the normal power levels being defined by a specification for the cable, the ground bounce being defined as a transmission voltage which appears as less than a local ground potential; and wherein the suspending communication includes suspending the configuration channel signal path while the host, the cable and the device all change their reference voltage and increase the voltage swing on the configuration channel signal path.

14. The environment of claim 13, wherein:
the changing the reference voltage of the cable to operate in the higher power mode of operation comprises increasing the reference voltage on the configuration channel signal path whole maintaining a constant cable resistance.

15. The environment of claim 13, wherein:
the cable corresponds to a USB type-C cable.

16. The environment of claim 15, wherein:
the reference voltage is changed on the configuration channel signal path.

17. The environment of claim 13, wherein:
a diameter of the cable is minimized when compared to a diameter that would be required without use of the negotiation operation.

18. The environment of claim 13, wherein:
a cable bundle is configured to fit properly with an over mold housing of a USB Type-C plug while also enabling the higher power mode of operation.

* * * * *